June 5, 1962 W. H. GORDON, JR 3,038,058
FOOD WARMING DISH
Filed June 25, 1959 3 Sheets-Sheet 1
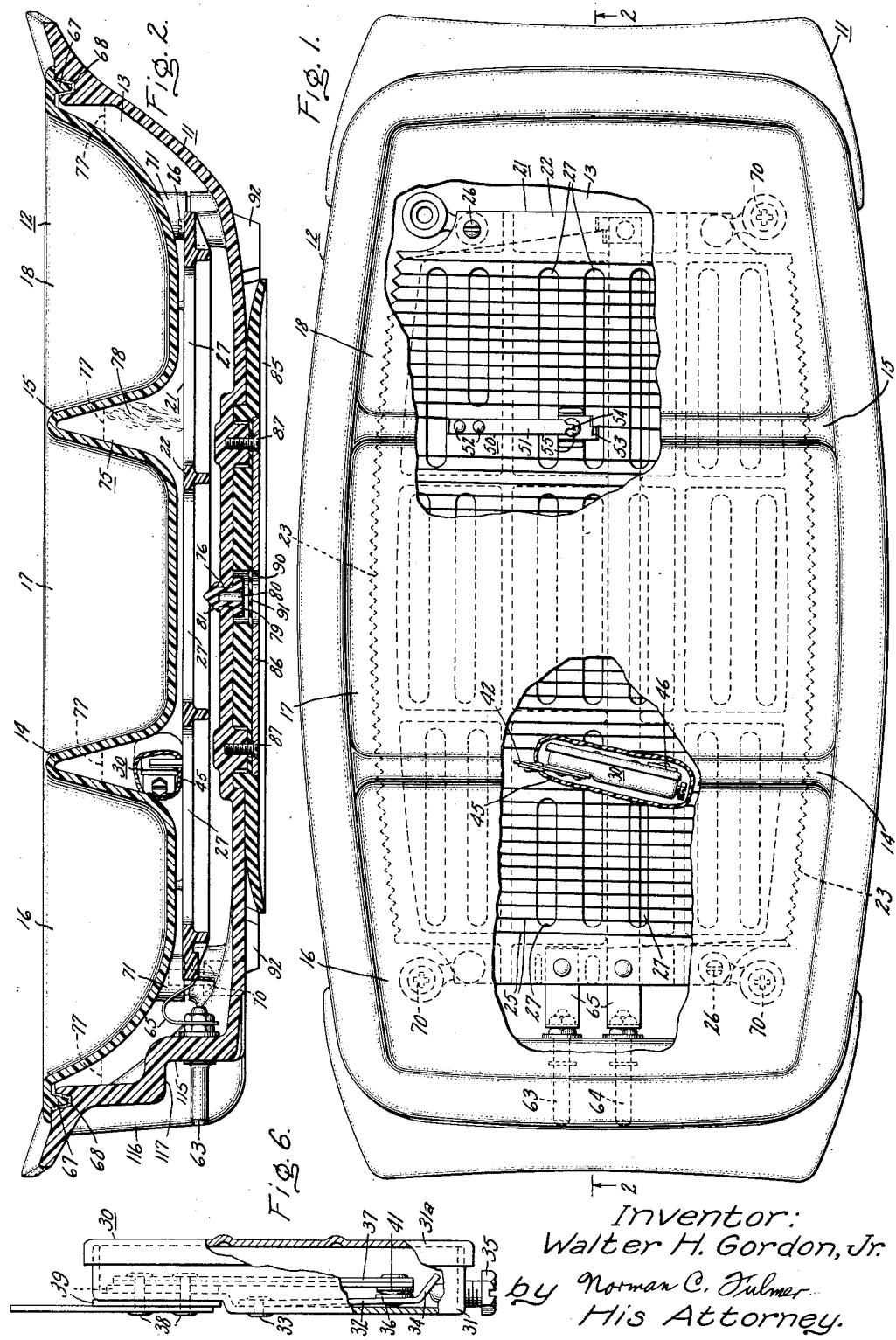
Inventor:
Walter H. Gordon, Jr.
by Norman C. Fulmer
His Attorney.

June 5, 1962  W. H. GORDON, JR  3,038,058
FOOD WARMING DISH
Filed June 25, 1959  3 Sheets-Sheet 2
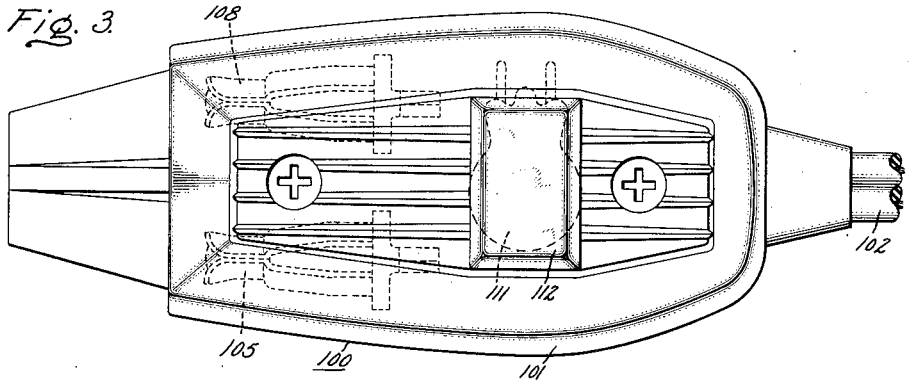
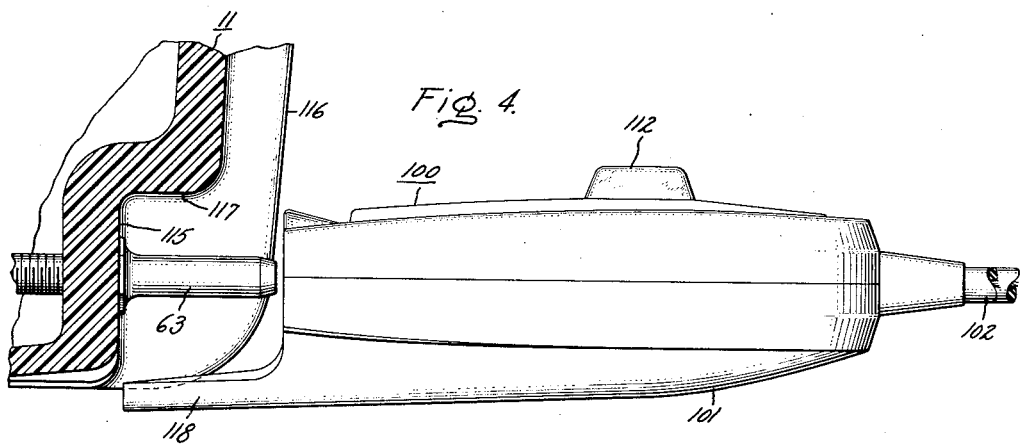
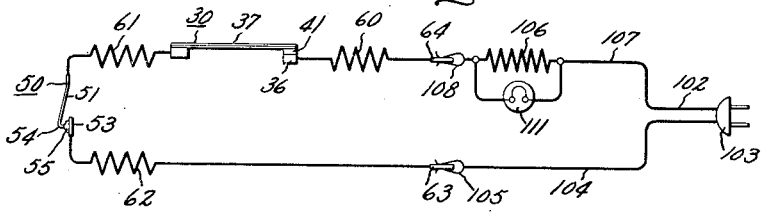
Inventor:
Walter H. Gordon, Jr.
by Norman C. Fulmer
His Attorney.

June 5, 1962 W. H. GORDON, JR 3,038,058
FOOD WARMING DISH
Filed June 25, 1959 3 Sheets-Sheet 3
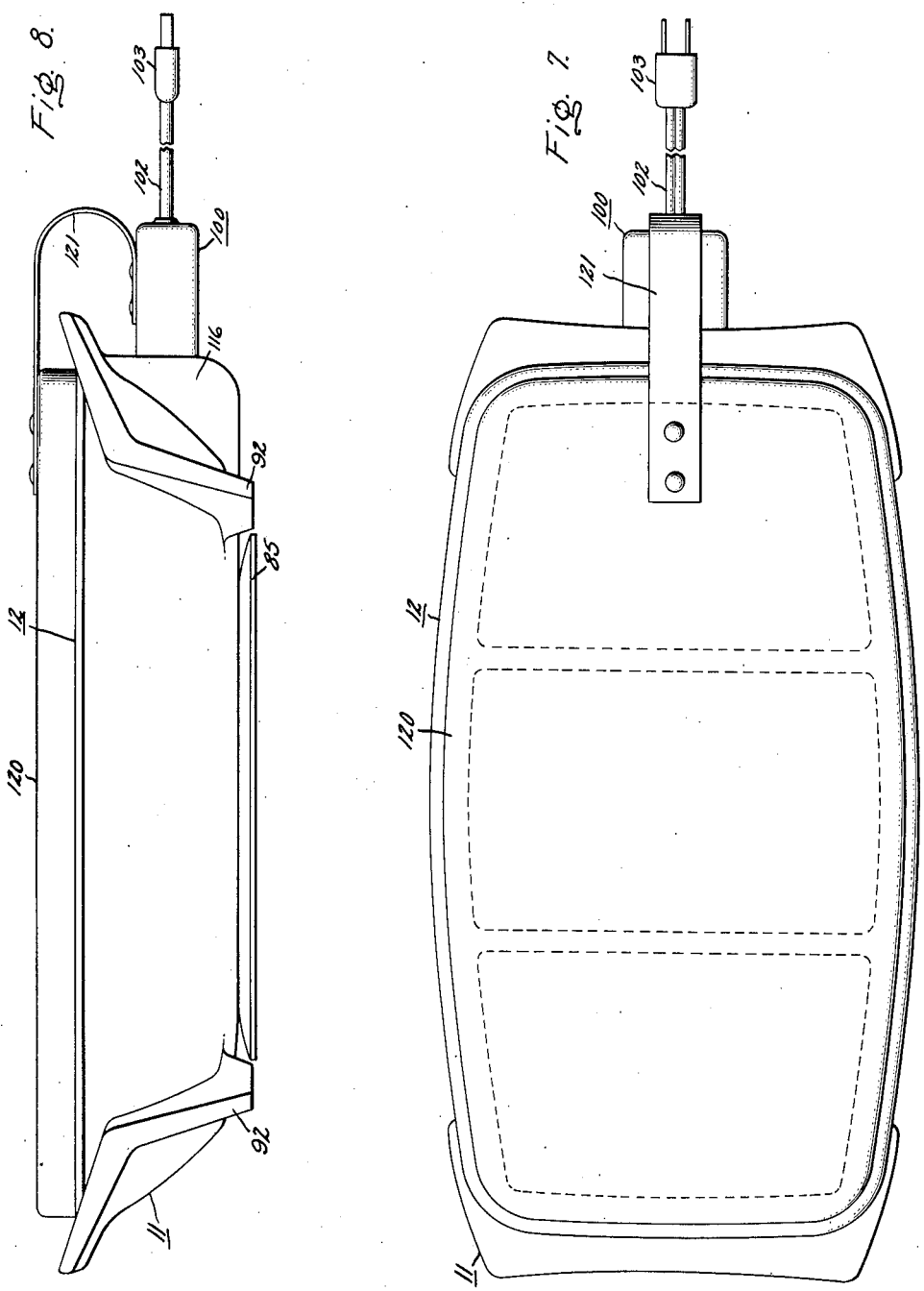
Inventor:
Walter H. Gordon, Jr.
by Norman C. Fulmer
His Attorney.

United States Patent Office 3,038,058
Patented June 5, 1962

3,038,058
FOOD WARMING DISH
Walter H. Gordon, Jr., Asheboro, N.C., assignor to General Electric Company, a corporation of New York
Filed June 25, 1959, Ser. No. 822,766
8 Claims. (Cl. 219—44)

This invention relates to food warming dishes, and particularly relates to an electrically heated food warming dish that is safe for use by, or for, children and infants.

A previously known type of food warming dish includes a reservoir for containing hot water, and the hot water imparts heat to the food contained in the dish. This type of heated dish, though widely used, is inconvenient and undesirable in many respects. For example, it is an inconvenience to fill the reservoir with hot water each time the dish is used, and if food already is in the dish there is a possibility of the water spilling or splashing onto the food. Also, the amount of warming of the food is apt to be inconsistent, since it depends upon variable factors, such as the amount of food in the dish, the temperature of the hot water placed in the reservoir, and the initial temperature of the food, e.g., sometimes the food will be initially at room temperature and at other times it will be initially at refrigerator temperature. These variable factors also cause an undesirable inconsistency in the length of time during which the food is maintained at a palatable temperature, and sometimes it is necessary to pour the cooled water out of the reservoir and refill with hot water. It will readily be appreciated that it is quite a feat to pour out the water and at the same time retain the food in the dish. In addition to the aforementioned drawbacks of the conventional water-heated food dish, there is a possibility that the water reservoir can become contaminated or unsanitary because it cannot readily be cleaned.

An object of the present invention is to overcome the above-mentioned drawbacks of a previously known type of food warming dish.

Another object is to provide a practical food warming dish that is heated by electricity.

A further object is to provide an electrically heated dish that is safe.

Still other objects and advantages of the invention will become apparent from the following disclosure and the claims.

The invention utilizes an electrical heating element for warming a food dish. While it might seem obviously desirable to heat a food dish electrically, and although electrically heated food dishes have been attempted before, these dishes have not been practical and have not achieved popularity. The safety factor is a formidable deterrent to the use of an electrically heated food dish, especially when used for feeding infants, because an infant's inquisitive little fingers will tend to find any points of dangerous voltage. The invention comprises a combination of features, and subcombinations thereof, which achieve the desired objects and which make possible, for the first time, a safe and practical electrically heated food dish.

The food warming dish in accordance with the present invention comprises a dish having a heat-storing material contained internally thereof. An electrical heater element is embedded in the heat-storing material, and a detachable connector is provided on the outside of the dish for supplying current to the heater element. Also embedded in the heat-storing material is a thermostat switch which is electrically connected to the heater element to limit the amount of heating to a desired value. A thermal safety fuse also is embedded in the heat-storing material and is electrically connected to interrupt the current flow in the heater element in the event that an excessive temperature occurs. A safety plug is provided in the bottom wall of the dish and is adapted to give way upon the occurrence of excessive pressure within the dish. A rubber suction cup is attached to the bottom of the dish, and covers over and conceals the safety plug. This rubber suction cup is made sufficiently thin at the region of the safety plug so that it will readily rupture if the safety plug should be required to function. As an additional safety feature, a cover may be provided for the dish and attached to the detachable connector so as to insure that the connector must be disconnected before food can be eaten from the dish.

In the drawing:
FIG. 1 is a top view of a preferred embodiment of the invention, with portions thereof shown broken away so as to show the internal construction thereof;
FIG. 2 is a cross-section view taken on the line 2—2 of FIG. 1;
FIG. 3 is a top view of a connector assembly used in carrying out the invention;
FIG. 4 is a side view of the connector assembly shown in relationship to the food warming dish;
FIG. 5 is a schematic diagram of the electrical circuit of the invention;
FIG. 6 is a broken-away view of a thermostat used in the invention, and
FIGS. 7 and 8 are top and side views, respectively, of a further embodiment of the invention.

The preferred embodiment of the food warming dish, in accordance with the invention, comprises a dish-shaped base member 11, preferably somewhat rectangular in over-all shape as shown in the drawing. A compartmented tray 12 is positioned within the base 11 and is shaped to provide a space 13 between the base 11 and the tray 12 internally of the food warming dish. The tray 12 is provided with one or more partitions 14, 15 for providing two or more compartments 16, 17, 18 for containing food. Preferably the base 11 and the tray 12 are made of a suitable plastic material, such as melamine formaldehyde.

In the internal space 13 there is provided a heater assembly 21, comprising a heater board 22 having a size and shape so as to substantially fill the space 13. The heater board 22 preferably is made from a plastic material, such as phenol formaldehyde, and opposite sides thereof are provided with a series of notches 23. A heater wire 25 is wound around the heater board 22 and is seated in the notches 23 at the edges of the board. The heater wire may be No. 30 A.W.G.—180 alloy, 1.9 ohms/ft. The heater board 22 is fastened to the base member 11 by means of screws 26. A plurality of openings 27 in the heater board 22 functions to permit circulation of a heat retentive material as will be described later on.

A thermostat 30 is attached to the heater board 22, preferably at a position where space is provided by a partition 14, as shown in the drawing. The thermostat 30 is connected electrically in series with the heater wire 25, and consists of an encased unit containing a bimetal strip which function as a heat-sensitive switch, in a well known manner. Preferably the thermostat 30 is set to break open the electrical circuit when it reaches a temperature of, for example, 120° F.

Details of the thermostat 30 are shown in FIG. 6. A metal case 31 and cover 31A enclose a strip of metal 32 attached at an end thereof to the case 31 by means of a rivet 33 and having an angularly off-set portion 34 at the other end thereof against which is wedged the end of an adjustment screw 35 which is threaded through the metal casing 31. The strip 32 contains a contact 36, and adjustment of the screw 35 against the angularly off-set portion 34 of the strip 32, causes the contact 36 to be adjusted upwardly or downwardly, for adjusting the temperature at which the switch operates, as will be readily apparent. A bimetal strip 37 is attached to the case 31 by means of rivets 38, and is insulated from the case 31 by means of fiber insulator strips 39. A contact 41 at the end of the bimetal strip 37 normally engages the contact 36, thereby providing an electrical circuit between the case 31 and a connector lug 42 connected to the bimetal strip 37 by means of the rivets 38. By proper selection and dimensioning of the bimetal strip 37, and by proper adjustment of the adjusting screw 35, the bimetal strip 37 will cause the contacts 36, 41 to open and break the electrical circuit when the temperature of the thermostat reaches a desired value, such as about 120° F. The thermostat 30 may be embedded within the epoxy compound, if desired, as indicated at 45 in FIGS. 1 and 2. The thermostat 30 is connected in series with the heater wire 25 by means of the lug 42 and a lug 46 attached to the cover 31A.

A thermal fuse 50 is connected in series with the heater wire 25, and preferably comprises a strip-like spring 51 of resilient metal attached at one end thereof to the heater board 22 by means of rivets 52, the other end thereof being soldered to a terminal strip 53 by means of solder that melts at a temperature of about 200° F. A suitable material for this solder is a bismuth alloy containing 52.5% bismuth, 31.5% lead, and 16% tin, and having a melting point of 208.4° F. Preferably, the soldered end of the fuse strip 51 contains a tongue 54 which extends laterally from the strip 51 and into an opening in the terminal strip 53, the solder 55 being arranged to hold the tongue 54 in the opening of the terminal strip 53. The spring strip 51 is pre-stressed so as to pull the tongue 54 out of contact with the terminal strip 53 if the solder 55 melts. The thermal fuse 50 is connected electrically in series with the heater wire 25, the wire 25 being attached thereto at the terminal strip 53 and at the end of the strip 51 near the rivet 52.

It will be seen that the heater wire 25 is divided into three portions by the thermostat 30 and the thermal fuse 50, these three portions being designated 60, 61 and 62 in FIG. 5. The portion 61 of the heater wire is connected between the thermostat 30 and the thermal fuse 50, the portion 60 is connected between the thermostat 30 and a terminal pin 64, and the portion 62 is connected between the thermal fuse 50 and a terminal pin 63. The heater wire portions 60 and 62 are connected to the terminal pins 63 and 64 by means of connector straps 65.

After the heater board assembly 21 is in place and is connected electrically, the tray 12 is sealed in place to the base 11. This is accomplished by providing the tray 12 with a downwardly extending continuous annular ridge 67 which engages a mating groove 68 in the base 11, and the ridge 67 is secured into the groove 68 by means of an adhesive such as "Resiweld No. 2." The tray 12 is mechanically attached to the base 11 by means of four screws 70 extending upwardly through suitable openings in the bottom of the base 11 and into threaded bosses 71 extending downwardly from the bottom of the tray 12. The completed assembly of the base 11 and tray 12 provides a housing that is impervious to moisture.

The space 13 between the base 11 and the tray 12 is substantially filled with a flow-type of heat retentive material 75, which is poured into place through a small opening 76 in the bottom of the base member 11, the food warming dish being inverted for this filling process, whereafter the opening 76 is plugged as will be described. Suitable heat retentive materials are, for example, wax, paraffin, oil, and sand. The main requisites for the heat retentive material 75 are that it should have suitable heat retentive characteristics, and that it should be of a flowing nature so that it can be poured through the opening 76 and so that it will assume a direct thermal engagement with the heater wire 25. Paraffin has adequate "flow" characteristics, because it is molten when poured into place and when at the operating temperature of the food warming dish. Oil, such as mineral oil, or other types of oil, obviously have the required "flow" characteristics. Likewise, sand or other granular material has a suitable "flow" characteristic. A sufficient amount of heat retentive material is provided in the space 13, so that its upper level will be approximately as indicated by the dotted line 77 in FIG. 2.

The fill opening 76 is sealed by a rubber plug 79 which preferably has an opening 80 extending partially therethrough, and an enlarged forward end 81 so that the plug 79 can readily be inserted through the opening 76 and will thereafter remain in position. The material of which the plug 79 is made, and the dimension of the hole 80, are such that if undue pressure should build up within the hollow space 13, the plug 79 will be forceeably ejected, thereby relieving the pressure.

A rubber suction cup 85, preferably generally rectangular or oval in shape, is attached to the bottom of the base 11 by means of a metal plate 86 and screws 87. The metal plate 86 is provided with an opening 90 in alignment with the safety plug 79, and the portion 91 of the rubber suction cup in this region is sufficiently thin so that it can be ruptured readily by the plug 79 in the event of a safety plug blow-out. The suction cup 85 functions in the well-known manner to hold the food warming dish to a table top. It can readily be removed if not wanted, in which case the dish is supported by four legs 92 which extend from the bottom thereof.

A connector assembly 100 is provided for the purpose of making a detachable electrical connection to the terminal pins 63 and 64. As shown in FIGS. 1, 2 and 4, these terminal pins 63 and 64 are mutually parallel and are sealed through the wall of the base 11 in a moisture-tight manner by means of washers and nuts. The connector assembly 100 comprises a housing 101, made of a suitable material, preferably a plastic such as melamine formaldehyde. A power cord 102 extends from the case 101, and terminates at a conventional power plug 103. Internally of the casing 101, one of the power wires 104 is connected to a connector 105 which is adapted to engage the terminal pin 63. A resistor 106 is connected between the other power wire 107 and a connector 108 which is adapted to engage the terminal pin 64. The resistor may comprise, for example, a two-inch length of number 29 A.W.G. Nichrome wire. A pilot lamp 111 is connected electrically in parallel with the resistor 106, and is positioned so that light therefrom will be visible through a transparent or translucent jewel 112 positioned on or within the wall of the casing 101. It has been found that, with the resistor 106 having a value of approximately 1 ohm, the lamp 111 should be of a type that will light sufficiently at a voltage of 1½ volts.

As can clearly be seen in FIG. 4, the base 11 of the food warming dish is provided with a recess 115 at the bottom part of an end thereof, and the sides of this recess are flanked by ribs 116. The terminal pins 63, 64 extend from the base 11 at the recess 115, and are relatively protected at the top and sides by means of the ribs 116 and a shoulder 117 in the base 11 at the upper side of the recess 115. Insofar as the base 11 is concerned, the terminal pins 63 and 64 are exposed from the bottom thereof. A projecting lip 118 is provided on the casing 101 of the connector assembly 100, and extends forwardly thereof so that while the connector assembly is being plugged into place, or unplugged, the safety lip 118 extends underneath the terminal pins 63 and 64 so as to prevent a person's (especially an infant's) fingers from accidentally coming into contact with the terminal pins 63 and 64 when power is connected to them by means of the contacts of the connectors 105 and 108. The safety lip has a length sufficiently long so that the electrical contact to the terminal pins 63 and 64 will be broken before fingers or other objects can reach the terminal pins 63 and 64.

In the embodiment shown in FIGS. 7 and 8, a cover 120 is attached to the connector assembly 100 by means of a curved resilient strip-like spring member 121. The cover 120 is arranged to fit over the top of the dish when the connector assembly is plugged onto the terminal pins 63, 64, and is held downwardly against the top of the dish due to the resiliency of the spring member 121. The cover 120 functions to cause heat to be retained in the dish, and also performs a safety function by insuring that the electrical connector 100 must be removed before food can be eaten from the dish. When the connector 100 and cover 120 are removed from the dish, the resiliency of the spring member 121 allows the cover 120 to become disengaged from the dish when the connector 100 is disconnected. With the spring 121 shaped as shown, removal of the connector and cover is facilitated by lifting upwardly on the spring 121 with a finger while grasping the connector 100 to pull it from the dish. The cover 120 may be made from a plastic such as melamine formaldehyde and the spring 121 may be made from a metal such as stainless steel, or from a resilient plastic material such as nylon.

The food warming dish functions as follows: the connector assembly 100 is plugged onto the terminal pins 63, 64, and the power plug 103 is plugged into a power socket, either before or after food is placed in one or more of the compartments 16, 17 and 18. The heater wire 25 will become warmed due to the current flowing therein, and will heat the heat retentive material 75, which in turn will impart heat to the food in the compartments 16, 17 and 18. If the heat retentive material 75 is an oil, or a wax, or paraffin (which becomes fluid when heated by the heater wire 25), it will circulate through the openings 27 due to a natural convection process, so that the material 75, and hence the food in the compartments, will become heated more rapidly. The heater board 22 is sufficiently thick to cause the heater wire 25 to be adequately spread out in the space 13 so as to heat the material 75 quickly and uniformly. A network 78 of heat-conducting material, in the form of metal particles, or wire or shredded foil, may be immersed throughout all or part of the heat retentive material 75, to facilitate rapid heat distribution. The material of the network 78 should be a better heat conductor than the heat retentive material 75, and should be electrically separated from the heater wire 25. If the network 78 is in contact with the heater wire 25 at a plurality of points, the heater wire preferably should have an electrically insulative coating or covering.

When the heat retentive material 75 becomes the proper temperature for bringing the food to a palatable warmth, the thermostat 30 will operate to open the electric circuit and stop the heating process. When the heat retentive material 75 cools slightly, the thermostat 30 will close the electrical circuit, thereby causing the heater wire 25 to bring the heat retentive material to the heated condition. Although the heat retentive material will fluctuate slightly in temperature due to the functioning of the thermostat 30, the range of operating temperature is suitable for maintaining the food at a palatable temperature. Since the thermostat 30 is located in the heat retentive material 75, rather than being in thermal contact with the heater wire 25, its functioning will depend upon the temperature of the heat retentive material rather than upon the temperature of the heater wire, thus providing accurate control of the temperature of the heat retentive material 75.

The lamp 111, being connected in a series circuit with respect to the heater wire 25, will light whenever current is flowing in the heater wire. Thus, when the food warming dish is first turned on, the lamp 111 will light. After a few minutes, the lamp 111 will go off, indicating that the thermostat 30 has opened the circuit due to the temperature having reached a proper value. When the lamp 111 goes out, the connector assembly 100 may be removed from engagement with the terminal pins 63, 64 and the dish may be placed in front of the infant for feeding. The heat retentive material 75 has sufficient heat mass to maintain the food at a satisfying temperature for approximately one-half hour, which is adequate for a normal feeding. If the feeding should be interrupted, the dish can be again plugged into the connector assembly 100 in order to maintain the food warm. A material 75 such as paraffin, which changes from a liquid state to a solid state while the dish is being used, gives up its latent heat of fusion and thus prolongs the period of warmth.

For obsolute safety, in the event that the thermostat 30 should fail to operate and open the electrical circuit when the proper temperature has been reached, the thermal fuse 50 will function when the temperature of the heat retentive material 75 reaches a higher value, for example, about 200° F., and will open the electrical circuit thereby turning off the heating power. If this should happen, the food warming dish is no longer serviceable, due to the defective thermostat and the open thermal fuse. If excessive internal pressure should build up due to excessive heat, the plug 79 will function to relieve the pressure.

It will be appreciated that I have provided a practical, serviceable, and convenient food warming dish which is automatic in operation and thoroughly safe for use with an infant. Being a completely sealed unit, it can be immersed in water for washing, and can be washed in a dishwasher machine. The food warming dish is automatically brought to and maintained at adequate temperature, and is electrically safe because no power is connected to it while in use for feeding an infant. Furthermore, while power is being applied to the food warming dish, it is relatively safe because of the thermostat 30, the thermal fuse 50, and the safety plug 79. The combination cover and connector plug, shown in FIGS. 7 and 8, is an additional safety feature. It is these features, which provide automatic operation and absolute safety, that render my food warming dish practical, whereas previous attempts to provide an electrically heated food warming dish have failed.

While a preferred embodiment of my invention has been shown and described, various other embodiments and modifications thereof will occur to those skilled in the art, but such other embodiments and modifications will fall within the scope of my invention as defined in the following claims.

What I claim as new and desire to secure by Letters Patent of the United States is:

1. A food warming dish comprising a hollow dish structure containing a flow-type of heat retentive material therewithin, an electrical heater embedded in said heat retentive material, electrical terminal means positioned on the outside of said dish and connected electrically to said heater, an electrical power connector adapted for removable engagement with said terminal means, a thermostat embedded in said heat retentive material and connected to open the circuit of said heater whenever the temperature of said heat retentive material reaches a predetermined value, a thermal fuse embedded in said heat retentive material and connected to open the circuit of said heater in the event that the temperature of said heat retentive material reaches a predetermined value higher than the first named predetermined value, an opening in the bottom wall of said dish, a safety plug positioned in said opening and adapted to give way in the event that the pressure within said dish reaches a predetermined value, and a suction cup attached to the outside of said dish and overlying said safety plug, said suction cup being sufficiently rupturable in the vicinity of said plug so as to be ruptured by said safety plug when the plug gives way in the event of excessive pressure within said dish.

2. A food warming dish comprising a dish-shaped base member, a dish-shaped tray member seated within said base member to define a space between said base and tray members internally of said dish, said tray member being provided with at least one upwardly extending partition for defining a plurality of food compartments, said partitions having hollow interiors which communicate with said internal space, sealing means for sealing said base and tray members together at the rims thereof, a flow-type of heat retentive material being provided in said internal space and extending into the hollow interiors of said partitions, an electrical heater embedded in said heat retentive material, electrical terminal means positioned on the outside of said base member and connected electrically to said heater, an electrical power connector adapted for removable engagement with said terminal means, a thermostat embedded in said heat retentive material and located at least in part within one of said hollow interiors which communicate with said internal space and being connected to open the circuit of said heater whenever the temperature of said heat retentive material reaches a predetermined value, and a thermal fuse embedded in said heat retentive material and connected to open the circuit of said heater in the event that the temperature of said heat retentive material reaches a predetermined value higher than the first-named predetermined value.

3. A food warming dish comprising a dish-shaped base member, a dish-shaped tray member seated within said base member to define a space between said base and tray members internally of said dish, said tray member being provided with at least one upwardly extending partition for defining a plurality of food compartments, said partitions having hollow interiors which communicate with said internal space, sealing means for sealing said base and tray members together at the rims thereof, a flow type of heat retentive material being provided in said internal space and extending into the hollow interiors of said partitions, an electrical heater embedded in said heat retentive material, electrical terminal means positioned on the outside of said base member and connected electrically to said heater, an electrical power connector adapted for removable engagement with said terminal means, a thermostat embedded in said heat retentive material and connected to open the circuit of said heater whenever the temperature of said heat retentive material reaches a predetermined value, and a thermal fuse embedded in said heat retentive material and located at least in part within one of said hollow interiors and being connected to open the circuit of said heater in the event that the temperature of said heat retentive material reaches a predetermined value higher than the first-named predetermined value.

4. A food warming dish comprising a dish-shaped base member, a dish-shaped tray member seated within said base member to define a space between said base and tray members internally of said dish, said tray member being provided with at least one upwardly extending partition for defining a plurality of food compartments, said partitions having hollow interiors which communicate with said internal space, sealing means for sealing said base and tray members together at the rims thereof, a flow-type of heat retentive material being provided in said internal space and extending into the hollow interiors of said partitions, an electrical heater embedded in said heat-retentive material, electrical terminal means positioned on the outside of said base member and connected electrically to said heater, an electrical power connector adapted for removable engagement with said terminal means, a thermostat embedded in said heat retentive material and located at least in part within one of said hollow interiors and being connected to open the circuit of said heater whenever the temperature of said heat retentive material reaches a predetermined value, and a thermal fuse embedded in said heat retentive material and located at least in part within one of said hollow interiors and being connected to open the circuit of said heater in the event that the temperature of said heat retentive material reaches a predetermined value higher than the first-named predetermined value.

5. A food warming dish comprising a hollow dish structure containing a flow type of heat retentive material therewithin, an electrical heater embedded in said heat retentive material, electrical terminal means positioned on the outside of said dish and connected electrically to said heater, an electrical power connector adapted for removable engagement with said terminal means, a heat conductive network of a material having higher heat conductivity than said heat retentive material, said network being immersed in said heat retentive material and being in thermal proximity to said heater at a plurality of points, a thermostat embedded in said heat retentive material and connected to open the circuit of said heater whenever the temperature of said heat retentive material reaches a predetermined value, a thermal fuse embedded in said heat retentive material and connected to open the circuit of said heater in the event that the temperature of said heat retentive material reaches a predetermined value higher than the first-named predetermined value, an opening in the wall of said dish, and a safety plug positioned in said opening and adapted to give way in the event that the pressure within said dish reaches a predetermined value.

6. A food warming dish comprising a hollow dish structure containing a flow-type of heat retentive material therewithin, and electrical heater embedded in said heat retentive material, a heat-conductive network of a material having higher heat conductivity than said heat retentive material, said network being immersed in said heat retentive material and being in thermal proximity with said heater at a plurality of points, a thermostat embedded in said heat retentive material and connected to open the circuit of said heater whenever the temperature of said heat retentive material reaches a predetermined value, and a thermal fuse embedded in said heat retentive material and connected to open the circuit of said heater in the event that the temperature of said heat retentive material reaches a predetermined value higher than the first-named predetermined value.

7. A food warming dish comprising a hollow dish structure containing a flow-type of heat retentive material therewithin, means for heating said heat retentive material, an opening in the wall of said dish, a safety plug positioned in said opening and adapted to give way in the event that the pressure within said dish reaches a predetermined value, and a rupturable member attached to the outside of said dish and overlying said safety plug, said rupturable member being adapted to be ruptured by said safety plug when the safety plug gives way.

8. A food warming dish comprising a hollow dish structure containing a flow-type of heat retentive material therewithin, means for heating said heat retentive material, an opening in the bottom wall of said dish, a safety plug positioned in said opening and adapted to give way in the event that the pressure within said dish reaches a predetermined value, a suction cup attached to the outside of said dish and overlying said safety plug, said suction cup being sufficiently rupturable in the vicinity of said plug so as to be ruptured by said safety plug when the plug gives way in the event of excessive pressure within said dish.

References Cited in the file of this patent

UNITED STATES PATENTS

| | | |
|---|---|---|
| 1,133,073 | Venner | Mar. 23, 1915 |
| 1,323,471 | Heiser | Dec. 2, 1919 |
| 1,475,630 | Herz | Nov. 27, 1923 |
| 2,223,359 | Eisinga | Dec. 3, 1940 |
| 2,236,837 | Rimmel | Apr. 1, 1941 |
| 2,329,279 | Lower | Sept. 14, 1943 |
| 2,640,478 | Flournoy | June 2, 1953 |
| 2,708,436 | Foster | May 17, 1955 |
| 2,730,608 | Axelsson | Jan. 10, 1956 |
| 2,775,684 | Berliner | Dec. 25, 1956 |
| 2,817,744 | Free | Dec. 24, 1957 |
| 2,938,990 | Levine | May 31, 1960 |
| 2,969,452 | Geller et al. | Jan. 24, 1961 |

FOREIGN PATENTS

| | | |
|---|---|---|
| 403,820 | Great Britain | Jan. 4, 1934 |
| 343,211 | Great Britain | Feb. 19, 1931 |